United States Patent
Bikumala et al.

(10) Patent No.: US 11,379,767 B2
(45) Date of Patent: Jul. 5, 2022

(54) ADJUSTING A MASTER BUILD PLAN BASED ON EVENTS USING MACHINE LEARNING

(71) Applicant: Dell Products L. P., Round Rock, TX (US)

(72) Inventors: Sathish Kumar Bikumala, Round Rock, TX (US); Shibi Panikkar, Bangalore (IN); Deepak NagarajeGowda, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 16/701,351

(22) Filed: Dec. 3, 2019

(65) Prior Publication Data

US 2021/0166177 A1    Jun. 3, 2021

(51) Int. Cl.
| | |
|---|---|
| *G06Q 10/06* | (2012.01) |
| *G06N 3/08* | (2006.01) |
| *G06Q 50/28* | (2012.01) |
| *G06Q 50/04* | (2012.01) |

(52) U.S. Cl.
CPC ......... *G06Q 10/06315* (2013.01); *G06N 3/08* (2013.01); *G06Q 50/04* (2013.01); *G06Q 50/28* (2013.01)

(58) Field of Classification Search
CPC .. G06Q 10/06315; G06Q 50/04; G06Q 50/28; G06N 3/08
USPC ....................................................... 705/7.22
See application file for complete search history.

(56) References Cited

U.S. PATENT DOCUMENTS

| | | | | |
|---|---|---|---|---|
| 10,943,072 | B1* | 3/2021 | Jaganmohan | G06N 3/08 |
| 2003/0033179 | A1* | 2/2003 | Katz | G06Q 10/0631 |
| | | | | 705/7.12 |
| 2014/0018949 | A1* | 1/2014 | Linton | G05B 19/41865 |
| | | | | 700/99 |
| 2016/0371618 | A1* | 12/2016 | Leidner | G06N 5/025 |
| 2017/0262764 | A1* | 9/2017 | Karuppasamy | G06N 5/025 |
| 2018/0197128 | A1* | 7/2018 | Carstens | G06F 16/288 |
| 2019/0354544 | A1* | 11/2019 | Hertz | G06N 20/10 |

(Continued)

OTHER PUBLICATIONS

"Data, Text, and Web Mining for Business Intelligence: A Survey", Azmi, 2013 (Year: 2013).*

*Primary Examiner* — Charles Guiliano
*Assistant Examiner* — Po Han Lee
(74) *Attorney, Agent, or Firm* — Krishnendu Gupta; Deepika Bhayana; Lesley A. Leonessa (57) ABSTRACT

As an example, a server may receive and/or retrieve news items and process the news items using natural language processing to identify news related to entities (e.g., people, locations, and organizations) extracted from an enterprise resource planning system. A term frequency-inverse document frequency algorithm may be used to identify critical news items that may impact one or more supply chains associated with at least one product that is to be manufactured. A long short-term memory artificial recurrent neural network may be used to determine a confidence score for each critical news item. The confidence scores of the critical news items may be used to adjust replenishment planning and a master build plan that includes a plan to build the at least one product. In this way, news items may be used to automatically (e.g., without human interaction) adjust the master build plan.

20 Claims, 4 Drawing Sheets

(56) References Cited

U.S. PATENT DOCUMENTS

2020/0065759 A1\* 2/2020 McNamara ........ G06Q 10/0635
2020/0233857 A1\* 7/2020 Fehling .................. G06Q 40/12
2020/0410001 A1\* 12/2020 Sarkissian ............. G06F 16/903

\* cited by examiner

ADJUSTING A MASTER BUILD PLAN BASED ON EVENTS USING MACHINE LEARNING

BACKGROUND OF THE INVENTION

Field of the Invention

This invention relates generally to predicting, using machine learning, a master build plan (MBP) identifying how many devices of a particular type to build and more particularly to modifying the MPB based on events (including real-time events).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When manufacturing a product, such as a computing device, the various components used to assemble the product may be provided by different suppliers. The term supply chain refers to organizations (e.g., suppliers), people, activities, information, and resources involved when the components are transported from the suppliers to the manufacturer. These supply chains may be disrupted due to a number of factors, such as, for example, weather (e.g., flooding, tornado, hurricane, tsunami, earthquake, and the like) and labor unrest (e.g., employee strike, and the like). Such events may be difficult to predict ahead of time. In addition, current supply chain applications do not provide the ability to take into consideration real-time events. For example, severe weather that affects a supplier of a particular component may cause a ripple effect by delaying the production of products that use the particular component, particularly if other suppliers are not able to supply a similar component.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a server may receive and/or retrieve news items and process the news items using natural language processing to identify news related to entities (e.g., people, locations, and organizations) extracted from an enterprise resource planning system. A term frequency-inverse document frequency algorithm may be used to identify critical news items that may impact one or more supply chains associated with at least one product that is to be manufactured. A long short-term memory artificial recurrent neural network may be used to determine a confidence score for each critical news item. The confidence scores of the critical news items may be used to adjust replenishment planning and a master build plan that includes a plan to build the at least one product. In this way, news items may be used to automatically (e.g., without human interaction) adjust the master build plan.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use machine learning to analyze news data collected (e.g., scraped) from the Internet to modify a master build plan (MBP). The MBP includes information regarding how many products (e.g., computing devices) are to be produced in a particular time period (e.g., each month, each year) and is linked to manufacturing because the MBP indicates how much demand is forecast for each product, when (e.g., start of school) the demand is expected to arise, and where (e.g., which city, state, or country) the demand is expected to occur. The MBP may quantify processes, components, and other resources to optimize production, to identify bottlenecks, and to anticipate needs. Because the MBP drives factory activity, the accuracy of the MBP significantly affects profitability. For example, the factory may produce a particular quantity of a particular computing device based on a forecast. If the actual demand is less than the forecast demand, the unsold inventory may be sold at a reduced price, eroding margins and reducing profit. If the actual demand is greater than the forecast demand, the manufacturer may (i) ship units from inventory located farther away (e.g., thereby incurring greater shipping costs) or (ii) pay more for components to manufacture additional units because the volume of components purchased may be relatively small. In either case, the increased shipping costs or increased component costs may reduce profits.

The MBP may identify elements that have been proven to influence profitability, such as forecast demand, production costs, inventory costs, lead time, working hours, capacity, inventory levels, available storage, and parts (e.g., component) supply. The MBP may indicate what a company (e.g., Dell®) expects to produce (e.g., number of each type of server, number of each type of laptop, number of each type of desktop, etc.), what the company expects to purchase (e.g., number of components, such as keyboards, hard drives, sensors, and the like to be purchased), a quantity of each product to be produced, staffing levels, dates, locations, and the like. The MBP translates forecasted customer demand (sales orders, memorandum of agreement, and the like), into a build plan. Using the MBP helps avoid shortages, costly expediting, last minute scheduling, and inefficient allocation of resources. The MBP enables the company to consolidate planned parts, produce master schedules and forecasts for any level of the Bill of Material (BOM) for any type of part.

By using multiple variables as inputs, the MBP may generate a set of outputs used for decision making. Inputs may include forecast demand, production costs, inventory money, customer needs, inventory progress, supply, lot size, production lead time, and capacity. Inputs may be automatically generated by an ERP system that links a sales department with a production department. For example, when the sales department records a sale, the forecast demand may be automatically shifted to meet the new demand. Outputs may include amounts of each product to be produced, staffing levels, quantity available to promise, and projected available balance. Outputs may be used to create a Material Requirements Planning (MRP) schedule. Thus, the MBO provides information to production (e.g., factory), planning, purchasing, procurement, and management to plan and control manufacturing while tying forecasting to production, Several steps are involved in creating the machine learning used to modify the MBP. For example, data stored in an enterprise resource planning (ERP) system may be analyzed to identity entities (e.g., people, locations, and organizations) that are of interest, e.g., news associated with each entity may, in some cases, affect the MBP. The entities may be stored in an entity database. The machine learning may receive and/or retrieve news data from the Internet. For example, the news data may be retrieved by scraping particular news sites or by subscribing to a feed from particular news sites (e.g., Yahoo finance, CNN, The Financial Times, The Wall Street Journal, Weather.com, and the like). The particular news sites may include sites focused on economic and financial information and sites focused on the weather. The news data may be processed using natural language processing (NLP) to extract features (e.g., news about events) that are associated with the entities in the entity database.

The extracted features may be processed to identify critical features, e.g., news that is likely to impact (e.g., either positively or negatively) the supply chain or the forecasts for a particular location. For example, term frequency-inverse document frequency (TF-IDF) may be used to determine the critical features in the processed news data. TF-IDF a numerical statistic that identifies how important a word (e.g., an entity or a condition associated with the entity) is in the news data. To illustrate, a news article describing economic growth in a particular country may be used to increase the sales forecast for particular types of computing devices that the economic growth is projected to affect. For example, if the news data indicates that data centers are planned to be built in a particular country, the sales forecast for servers used in data centers may be increased. As another example, if the news data indicates that additional schools are planned to be built in a particular country, the sales forecast for laptops or tablets approved for use in schools the particular country may be increased. As a further example, if the news data indicates that a university has received a grant to perform research into a particular topic, the sales forecast for workstations approved for use in the university may be increased.

After the critical features have been identified, a neural network-based machine learning algorithm may be used to determine a confidence score associated with each critical feature. For example, a recurrent neural network (RNN) architecture, such as long short-term memory (LSTM) may be used to determine the confidence score associated with each critical feature. Unlike a feedforward neural network, LSTM uses feedback connections to not only process single data points but also sequences of data (e.g., multiple news items). An LSTM unit may include a cell, an input gate, an output gate and a forget gate. The cell remembers values over arbitrary time intervals and the three gates regulate the flow of information in and out of the cell. The LSTM algorithm may be used to make predictions based on time series data which may include gaps between critical events.

The confidence scores associated with each critical feature may be used to adjust replenishment planning (e.g., adjust how many units of a particular product to manufacture to replenish the stock of the particular product) and the master build plan (MBP). For example, if the news data indicates that severe weather will affect a particular area of the world, then the machine learning may determine (e.g., predict) that particular components in the supply chain that travel through that particular area may be delayed by the severe weather. The MBP may be adjusted to take into account the delay caused by severe weather. For example, a request to the supplier may be sent earlier than normal to enable the particular components to be shipped before the severe weather impacts the particular area. As another example, the particular components may be sourced from an alternate supplier that does not ship through the impacted area. As yet another example, customers whose orders are predicted to be impacted (e.g., delayed) by the severe weather may be notified of the delay and offered one or more alternatives. For example, the alternatives may include offering the customer an alternate product with a similar configuration, providing the customer with a monetary credit to compensate for the delay, or another type of alternative.

As an example, a server may include one or more processors and one or more non-transitory computer readable media to store instructions executable by the one or more processors to perform various operations. For example, the operations may include determining a set of news items associated with entities stored in an entity database. The plurality of entities may be extracted from an enterprise resourcing planning (ERP) system and may include, for example, a first plurality of people, a second plurality of locations, and a third plurality of organizations. For example, determining the set of news items associated with the entities stored in the entity database may include selecting a particular news item, using natural language processing (NLP) to determine that the particular news item is associated with a particular one of the entities, and including the particular news item in the set of news items. The operations may include determining a subset of the news items that is predicted to affect one or more supply chains used to supply components to manufacture at least one product. For example, determining the subset of the news items that is predicted to affect the one or more supply chains used to supply components to manufacture the at least one product may include performing a term frequency-inverse document frequency (TF-IDF) analysis of the set of news items associated with the entities, determining a TF-IDF value that increases proportionally to the number of times a particular entity of the entities appears in each news item offset by a number of news items in the set of news items that includes the word, and determining the subset of the news items based at least in part on the TF-IDF value associated with each of the entities. The operations may include determining a confidence score associated with each news item in the subset of news items using a long short-term memory (LSTM) recurrent neural network (RNN) algorithm. The operations may include modifying a replenishment plan based at least in part on the predicted affect to the one or more supply chains to create a modified replenishment plan. The operations may include performing a modification to a master build plan that includes a build plan associated with the at least one product based at least in part on the modified replenishment plan. The master build plan may be initially determined based at least in part on processing historical sales data using a Naïve Bayes algorithm.

Figure 1:
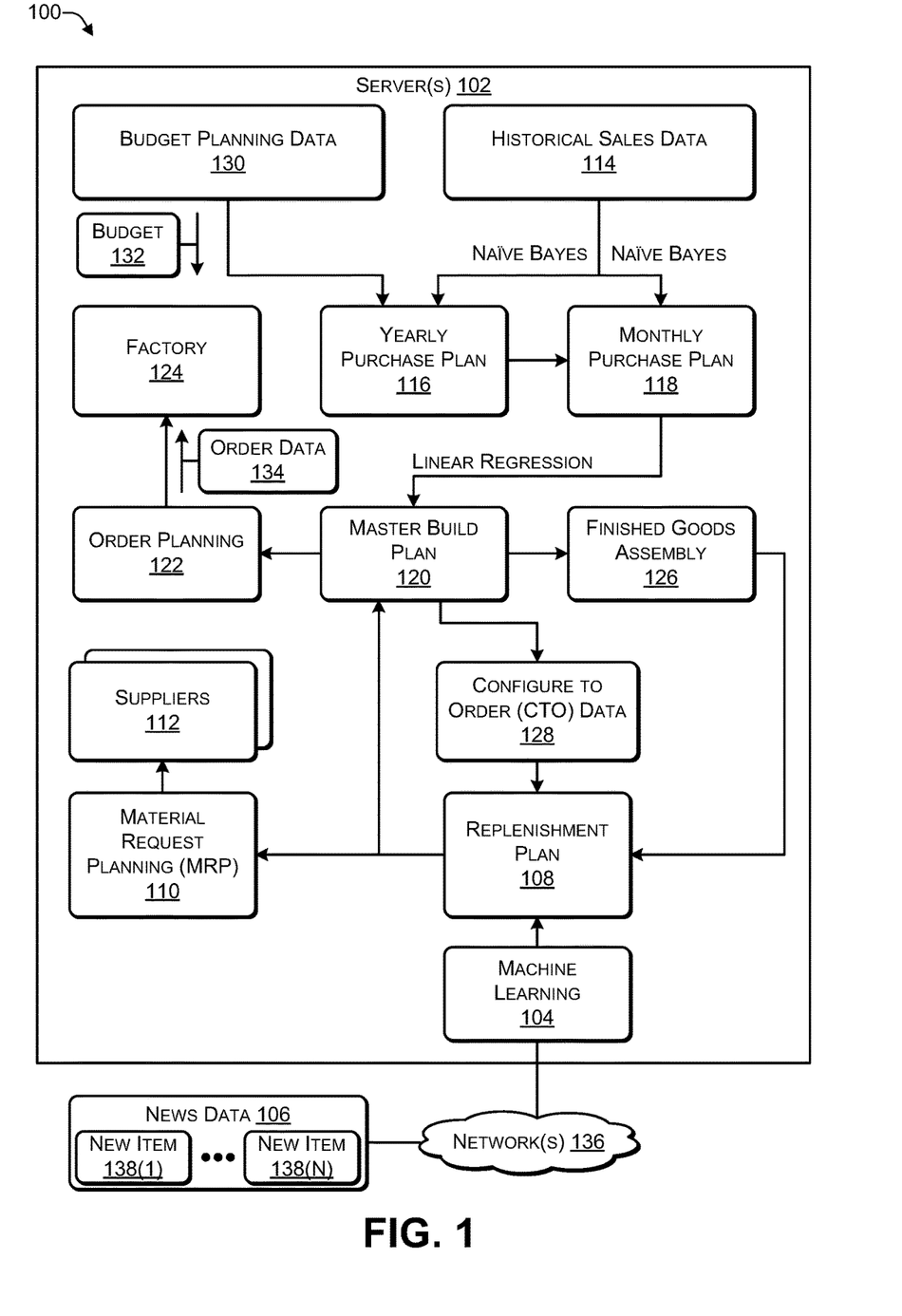
FIG. 1 is a block diagram of a system that uses machine learning to adjust a master build plan (MBP) based on news data, according to some embodiments.

FIG. 1 is a block diagram of a system 100 that uses machine learning to adjust a master build plan (MBP) based on news data, according to some embodiments. The system 100 may include one or more servers 102 that store data and software modules as described herein. For example, the servers 102 may be used to store machine learning 104 that receives (or retrieved) news data 106 over one or more networks 136. The news data 106 may include one or more news items 138(1) to 138(N) (N>0). The news data 106 may be filtered to identify information that is relevant to and may affect a replenishment plan 108. For example, the news data 106 may include information related to weather conditions in a particular location across which components used to build the product may be shipped. As another example, the news data 106 may include economic information related to a particular location. The machine learning 104 may use the filtered news data 106 to modify the replenishment plan 108. For example, if severe weather is predicted to affect a particular region, the replenishment plan 108 may be adjusted to account for the affect of the severe weather on the particular region. As another example, if an economic downturn or economic expansion is predicted for a particular region, the replenishment plan 108 may be adjusted accordingly.

When the replenishment plan 108 is modified, the modifications may affect material request planning (MRP) 110. The modifications to the MRP 110 may result in changes to component orders sent to component suppliers 112. For example, if the replenishment plan 108 has been adjusted to increase (or decrease) the number of computing devices to be manufactured due to an economic upturn (or downturn), the MRP 110 may be adjusted accordingly and the suppliers 112 may be asked to provide additional components (or provide fewer components) to enable the manufacturer to increase (or reduce) the number of computing devices that are to be manufactured.

Historical sales data 114 may be used to create a yearly purchase plan 116 and a monthly purchase plan 118. Budget planning data 130 including a particular budget 132 may also be used to determine the yearly purchase plan 116. A machine learning model, such as Naïve Bayes (or similar), may be used on the historical sales data 114 to predict the yearly purchase plan 116 and to predict the monthly purchase plan 118. Naïve Bayes determines the probability of an event (e.g., number of purchases of a particular type of computing device) occurring given the probability of another event (e.g., previous purchases of the particular type of computing device in the historical sales data 114) that has already occurred.

$$P(A|B)=(P(B|A)P(A))/P(B)$$

where A and B are events.

The Naïve Bayes machine learning predicts the probability of event A, (e.g., how many of a particular type of computing device are predicted to sell in a future time period, such as next month, next year, or the like) given that event B (e.g., how many of the particular type of computing device were sold in a previous time period, such as last month, last year, or the like) is true. Event B may also be referred to as evidence. P(A) is the priori of A (the prior probability, e.g., probability of an event before evidence is considered). The evidence is an attribute value of event B. P(A|B) is a posteriori probability of B, e.g., a probability of the event after the evidence is taken into consideration. For example, if 300 laptops were sold in year X, and 400 laptops were sold in year X+1, then the Naïve Bayes machine learning may determine that 500 laptops are predicted to be sold in year X+2. In this way, Naïve Bayes may use the historical sales data 114 to predict the yearly purchase plan 116. As another example, if 25 laptops were sold in the month of November in year X, and 33 laptops were sold in the month of November in year X+1, then the Naïve Bayes machine learning may determine that 42 laptops are predicted to be sold in year X+2. In this way, Naïve Bayes may use the historical sales data 114 to predict the monthly purchase plan 118.

A linear regression model may use the monthly purchase plan 118 to create a master build plan 120. The master build plan 120 may take into consideration the replenishment plan 108, including modifications made to the replenishment plan 108. Linear regression uses a linear approach to modeling the relationship between a scalar response (e.g., dependent variables) and one or more explanatory variables (e.g., independent variables). In linear regression, the relationships are modeled using linear predictor functions whose unknown model parameters are estimated from the data. Linear regression focuses on the conditional probability distribution of the response given the values of the predictors. Linear regression is used to fit a predictive model to an observed data set of values (e.g., the historical sales data 114) of the response and explanatory variables. The fitted model may be used to make a prediction of the response. Thus, the monthly purchase plan 118 may be used as input to a linear regression model to create (e.g., predict) the master build plan 120.

The master build plan 120 may be used to perform order planning 122 and to send order data 134 to a factory 124. For example, the factory 124 may be used to manufacture one or more types of computing devices based on components provided by the suppliers 112. The master build plan 120 may be used to create and modify configure to order (CTO) data 128. The CTO data 128 identifies computing devices configured and manufactured according to customer orders.

The master build plan 120 may be used to predict finished goods assembly 126 (e.g., how many finished goods, such as computing devices, are to be assembled in a particular time period). The finished goods assembly 126 may also be used as input to adjust the replenishment plan 108.

Thus, a Naïve Bayes machine learning model may use historical sales data and budget planning data to predict a yearly purchase plan and a monthly purchase plan. A linear regression model may use the monthly purchase plan to predict a master build plan. The master build plan may be used in order planning by the factory. A machine learning model may analyze news data to identify events that may influence the master build plan and the order planning. The machine learning may modify the master build plan based on the news data. For example, news data indicative of an economic upturn may result in the machine learning predicting that the number of computing devices to be manufactured in a future time interval be increased. News data indicative of an economic downturn may result in the machine learning predicting that the number of computing devices to be manufactured in a future time interval be decreased. News data indicative of severe weather across a particular region may result in the machine learning predicting that production may be delayed if no action is taken. The machine learning may also provide suggestions on actions to reduce the delay in production. For example, the machine learning may suggest that a different supplier be used to supply components. As another example the machine learning may suggest that the components provided by a particular supplier be routed through a different region that is unaffected by the severe weather. In this way, the master build plan may be automatically adjusted in near real time based on news data.

Figure 2:
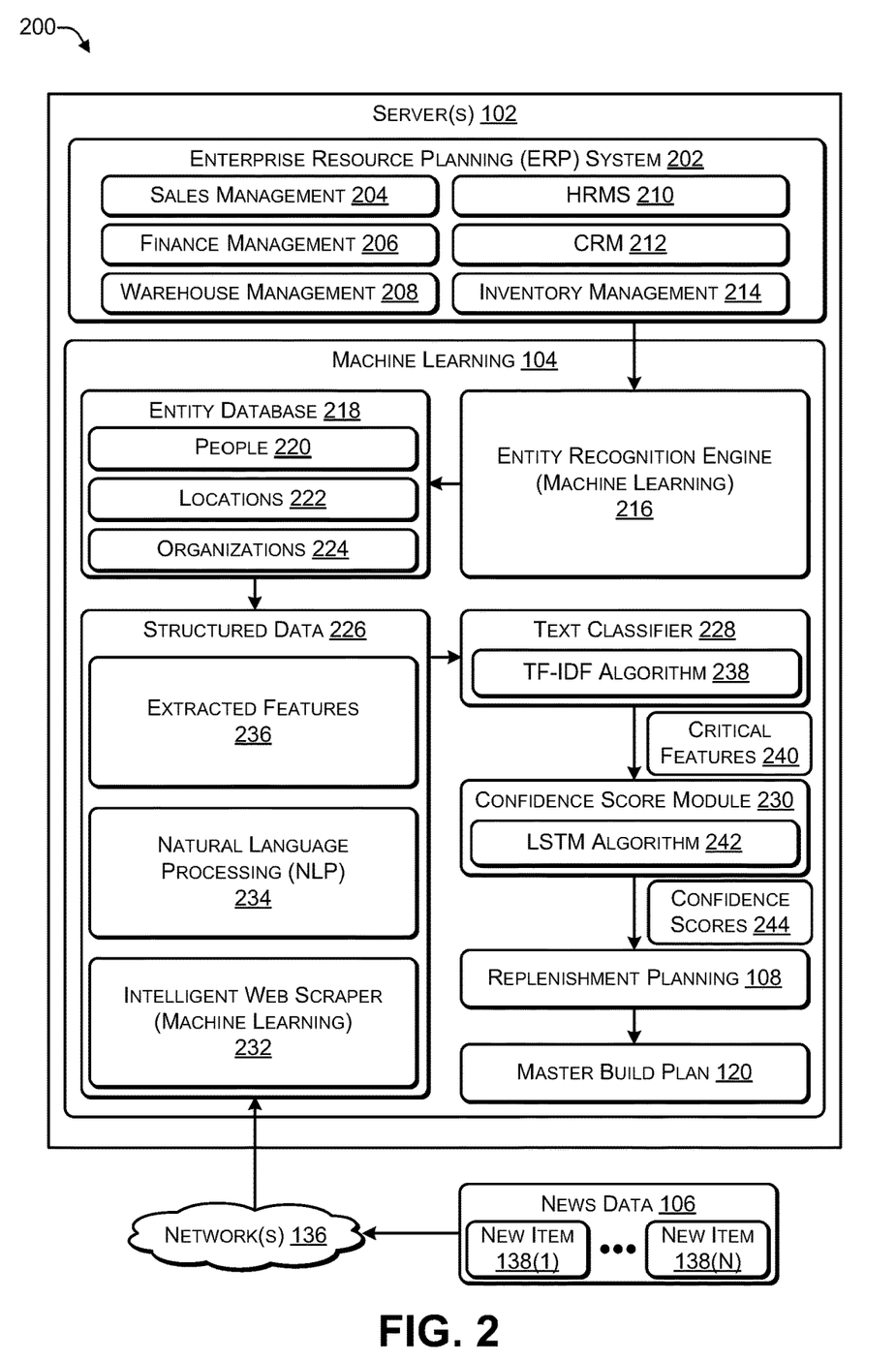
FIG. 2 is a block diagram of a system in which news data is used to adjust a master build plan (MBP), according to some embodiments.

FIG. 2 is a block diagram of a system 200 in which news data is used to adjust a master build plan (MBP), according to some embodiments. The system 200 illustrates how the machine learning 104 may be trained and may be used to analyze news data to modify the master build plan.

An enterprise resource planning (ERP) system 202 may include sales management system 204, a financing management system 206, a warehouse management system 208, a human resources management system (HRMS) 210, a customer relationship management (CRM) system 212, and an inventory management system 214. The ERP 202 is a system to manage the main business processes of a company (e.g., enterprise) and includes a suite of integrated applications 204, 206, 208, 210, 212, and 214 that the company uses to collect, store, manage, and interpret data related to the company's activities. The ERP 202 provides an integrated and continuously updated view of core business processes using databases maintained by a database management system. The ERP 202 may track business resources, such as, for example, cash, raw materials, production capacity, and the like, and may track the status of business commitments, such as, for example, orders, purchase orders, payroll, and the like. The applications 204, 206, 208, 210, 212, and 214 included in the ERP 202 may share data across various departments (manufacturing, purchasing, sales, accounting, etc.) that provide the data. The ERP 202 may run on a variety of servers 102 that include various computer hardware and network configurations, including a database to store information. The sales management 204 may include: internet order, non-internet orders, order to cash, order entry, credit checking, pricing, available to promise, inventory, shipping, sales analysis and reporting, and sales commissioning. The finance management system 206 may include: general ledger, fixed assets, payables including vouchering, matching and payment, receivables and collections, cash management, financial consolidation, budgeting, costing, cost management, and activity-based costing. The warehouse management 208 may include: engineering, bill of materials, work orders, scheduling, capacity, workflow management, quality control, manufacturing process, manufacturing projects, manufacturing flow, and product life cycle management. The HRMS 210 may include: recruiting, training, rostering, payroll, benefits, retirement/pension plans, diversity management, and separation management. The inventory management 214 may include: supply chain management: supply chain planning, supplier scheduling, product configurator, order to cash, purchasing, inventory, claim processing, and warehousing (receiving, picking and packing). The CRM 212 may include: sales and marketing, commissions, service, customer contact, and call center support.

An entity recognition engine 216 may use machine learning to process data stored in the ERP 202 to identify entities and store the entities in an entity database 218. For example, the entities may include people 220, locations 222, and organizations 224. The entities in the entity database 218 may include entities that are likely to influence the master build plan. For example, the people 220 may include prominent figures, such as, politicians, executives of companies, and the like whose actions may affect the master build plan 120. For example, a mayor of a city, a governor of a state, a head (e.g., president or prime minister) of a country, or other politician may announce a plan to invest a particular amount of money (e.g., to research a particular topic). In this example, the mayor, the governor, the head of a country, or another politician may be an entity in the people 220 portion of the entity database 218. The locations 222 may include locations where component suppliers are located, locations where factories are located, areas used across which couriers transport components from the component suppliers to the factories and transport assembled products from the factories to warehouses, and other relevant locations. The organizations 224 may include government organizations that purchase products (e.g., computing devices) from the enterprise (e.g., Dell®), companies that purchase products from the enterprise, organizations that supply components that are assembled in the factory to create products, and other organizations relevant to the master build plan 120.

The machine learning 104 may receive news data 106 via the network 136. The news data 106 may include data that is "pushed" from multiple sites (e.g., CNN.com, weather.com, and the like) to the machine learning 104. For example, the machine learning 104 may subscribe to news provided by each of the multiple sites. The news data 106 may include data that is "pulled" (e.g., scraped) from multiple sites. For example, an intelligent web scraper 232 may use machine learning to identify and pull data associated with entities in the entity database 218. The news data 106 may be processed using natural language processing (NLP) 234. The NLP 234 may use machine learning to process the news data 106. For example, the NLP 234 may use support vector machines, Bayesian networks, maximum entropy, conditional random field, neural networks, or deep learning to process the news data 106. The NLP 234 may process the news data 106 to extract and create extracted features 236, part of structured data 226. The extracted features 236 may be processed using a text classifier 228, a type of machine learning algorithm, to identify critical features 240. For example, the text classifier 228 may use term frequency-inverse document frequency (TF-IDF) algorithm 238 to identify the critical features 240. The TF-IDF algorithm 238 may use numerical statistics to determine how important a word is to a document in a collection of data (e.g., a news article). For example, the TF-IDF algorithm 238 may use a weighting factor to identify the critical features 240 in each news story. The TF-IDF value increases proportionally to the number of times a word appears in the document and is offset by the number of documents in the corpus that contain the word, to adjust for some words appearing more frequently in general.

A confidence score module 230 may use a long short-term memory (LSTM) algorithm 242 to generate confidence scores 244 based on the critical features 240. The LSTM algorithm 242 may use feedback connections to process single data points (e.g., individual news items) as well as sequences of data (e.g., multiple news items). The LSTM algorithm 242 may be used to make predictions based on time series data (e.g., the historical sales data 114 of FIG. 1) which may include gaps between critical events.

The confidence scores 244 associated with each of the critical features 240 may be used to adjust the replenishment planning 108 (e.g., adjust how many units of a particular product to manufacture to replenish the stock of the particular product) and the master build plan (MBP) 120.

The entity recognition engine 216 may scan the enterprise applications in the ERP 202 to identify and store entities associated with the supply chain. For example, if Dell® purchased 6,000 disc drives from Seagate® in 2018 that were shipped from a Seagate® factory in Singapore to a Dell® laptop factory in Beijing, China, then the entity recognition engine 216 may identify the organization Seagate® and the locations Singapore and Beijing.

The Machine Learning 104 may identify various types of economic events in the news data 106, including consumer confidence index, inflation index, gross domestic product (GDP) per capita, currency exchange rate, government initiatives, corporate initiatives, and the like and determine (e.g., predict) the impact of the events on sales of products, including sales of computing devices, such as, tablets, laptops, desktops, and the like. For example, a city, state, or country government may launch an initiative such as modernizing services (e.g., drivers licenses) provided by the government which involves purchasing computing devices and software applications. Based on the particular location where the computing devices are likely to be located, the projected sales of computing devices in the particular location may be increased. As another example, a corporation may announce an initiative to create, expand, or move a particular type of facility (e.g., information technology (IT) department) to a particular location. Based on the particular location where the computing devices are likely to be located, the projected sales of computing devices in the particular location may be increased.

Thus, by using news data to modify a master build plan, supply chain disruptions caused by severe weather, labor strife can be taken into account. While such events that impact the supply chain cannot be predicted, the systems and techniques described herein enable the master build plan to be modified to take into consideration unforeseen events, such as severe weather and labor strife.

The master build plan identifies how many of each particular product to manufacture for a particular year, for a particular month for a particular week, for a particular day, for a particular hour, and so on. The master build plan is used by the factory to schedule production of each particular product. The initial master build plan may be created based on an analysis of historical data, e.g., how many units were manufactured in each of previous years (e.g., prediction for year 2020 is based on sales in 2019, 2018, 2017 and so on), in a previous month (e.g., prediction for December is based on sales in each of October, September, August, July, and the like), in the same month a year ago (e.g., prediction for December 2020 is based on sales in December 2019, December 2018, December 2017, and so on).

Data in the ERP system may be used to find entities related to the supply chain, including people, places, and organizations. The entities are saved in the entity database and news items are analyzed to identify news related to one or more of the entities. For example, the organizations Samsung® and LG® may be suppliers of components (e.g., display panels) that are based in a particular location, e.g., Korea. The news data may be scanned for news related to the organizations (Samsung®, LG®) and the location (e.g., Korea). If a news item has data that includes one or more of the organizations or the location, then the news item may be classified (e.g., using a machine learning classifier), e.g., the classifier may predict whether the information in the news item is likely to impact the supply chain, how much of an impact on the supply chain, and whether the impact is likely to be positive or negative. If the information in the news item is predicted to impact the supply chain, then such a news item is considered a critical feature while news items predicted not to impact the supply chain may be considered non-critical. For critical features, the classifier may determine a score that predicts the likely impact. For example, the score may be positive or negative depending on whether the impact is predicted to be positive or negative. As another example, the score may be a percentage indicating the impact. To illustrate, a score greater than 100%, such as 120%, may cause production of the number of units of a particular product in the master build plan to be increased, e.g., by 20% (from 100% to 120%). A score less than 100%, such as 80%, may cause production of the number of units of a particular product in the master build plan to be decreased, e.g., by 20% (from 100% to 80%). Of course, other types of scores may be used. For example, the score may be a factional multiplier. A score greater than 1.0, such as 1.2, may cause production of the number of units of a particular product in the master build plan to be increased, e.g., by 20% (from 1.0 to 1.2). The number of units to be manufactured may increase from N to 1.2×N (N>0). A score less than 1, such as 0.8, may cause production of the number of units of a particular product in the master build plan to be decreased, e.g., by 20% (from 100% to 80%). The number of units to be manufactured may decrease from N to 0.8×N (N>0).

A confidence level may indicate the confidence in the score. For example, a news item may indicate that severe weather, such as a tsunami, will hit Korea next week. If a tsunami or other severe weather has previously impacted Korea several times in the past, the historical impact of the severe weather may be determined and used to create a confidence score regarding the impact of next week's tsunami. For example, if a tsunami in June has historically had a negative 20% impact (e.g., 20% reduction) and next week's tsumani is predicted to be as severe as the previous tsunamis, then the confidence score may be high (e.g., >90%), indicating that the machine learning is very confident about the predicted impact. The confidence score may be used to adjust replenishment planning and the master build plan.

Figure 3:
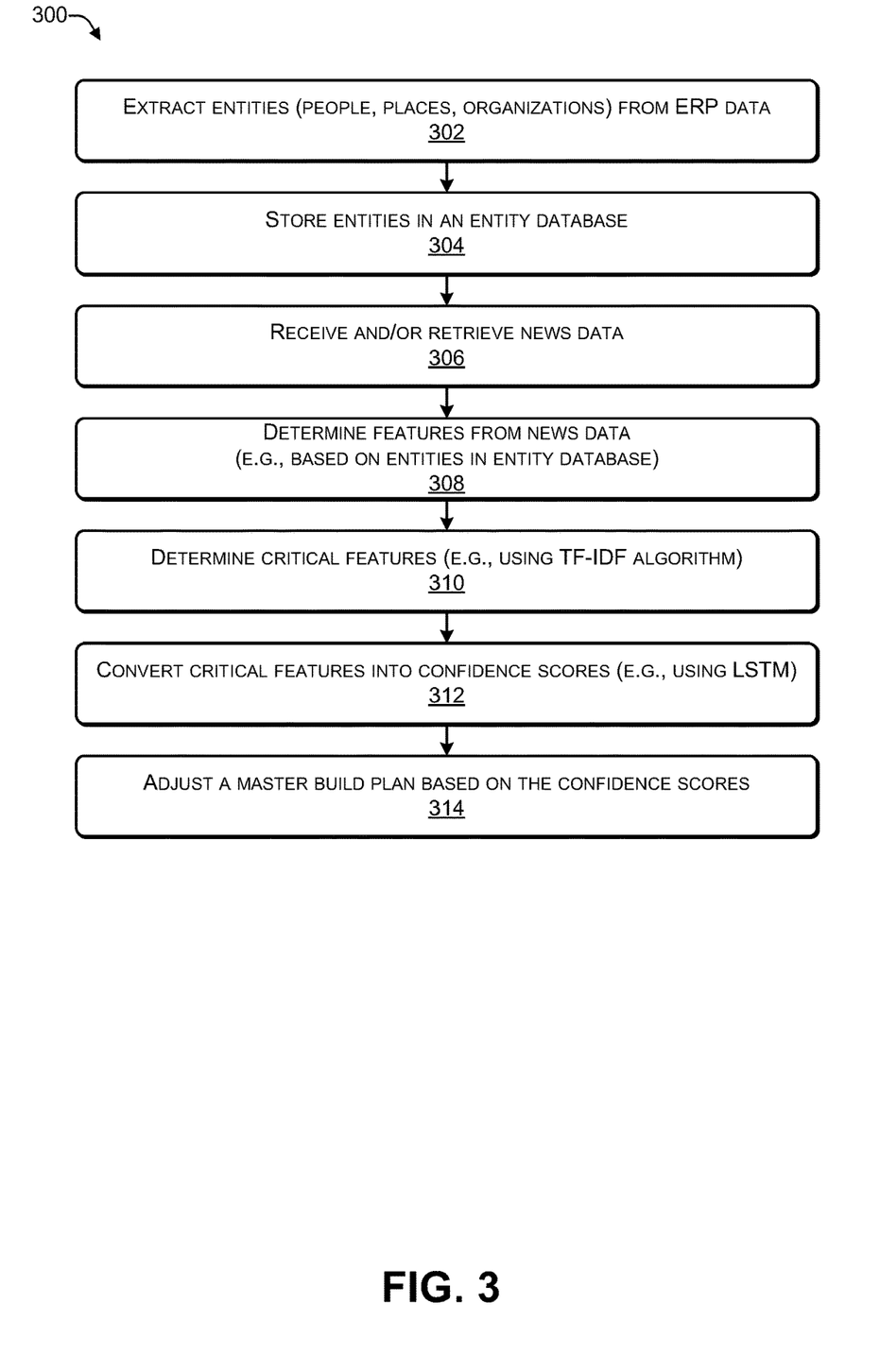
FIG. 3 is a flowchart of a process that includes adjusting a master build plan (MBP), according to some embodiments.

In the flow diagram of FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1 and 2, as described above, although other models, frameworks, systems and environments may be used to implement these processes.

FIG. 3 is a flowchart of a process that includes adjusting a master build plan (MBP), according to some embodiments. The process 300 may be performed by one or more components of the system 100 of FIG. 1 or the system 200 of FIG. 2.

At 302, the process may identify entities (e.g., people, places, and organizations) in an ERP system. At 304, the process may store the entities in an entity database. For example, in FIG. 2, the entity recognition engine 216 may use machine learning to process data stored in the ERP 202 to determine entities and store the entities in the entity database 218. The entities may include the people 220, the locations 222, and the organizations 224 in the ERP 202 that may affect the master build plan.

At 306, the process may receive and/or retrieve news data from sites on the internet. For example, in FIG. 2, the machine learning 104 may receive the news data 106 via the network 136. The news data 106 may include data that is "pushed" from multiple sites (e.g., CNN.com, weather.com, and the like) to the machine learning 104. For example, the machine learning 104 may subscribe to news provided by each of the multiple sites. The news data 106 may include data that is "pulled" (e.g., scraped) from multiple sites. For example, the intelligent web scraper 232 may use machine learning to identify and extract the news data 106 that is associated with the entities 220, 222, 224 in the entity database 218.

At 308, the process may determine features from the news data (e.g., based on the entities in the entity database). For example, in FIG. 2, the NLP 234 may process the news data 106 using NLP 234 to create the extracted features 236 (e.g., part of the structured data 226).

At 310, the process may determine (from among the extracted features) which are critical features. At 312, the process may create (e.g., using LSTM or similar) a confidence score corresponding to each critical feature. For example, in FIG. 2, the text classifier 228 may use the TF-IDF algorithm 238 to identify the critical features 240. The TF-IDF algorithm 238 may use numerical statistics to determine how important a word is to a document in a collection of data (e.g., a news article). For example, the TF-IDF algorithm 238 may use a weighting factor to identify the critical features 240 in each news story. The confidence score module 230 may use the LSTM algorithm 242 to generate confidence scores 244 corresponding to the critical features 240. The LSTM algorithm 242 may use feedback connections to process single data points (e.g., individual news items) as well as sequences of data (e.g., multiple news items). The LSTM algorithm 242 may be used to make predictions based on time series data (e.g., the historical sales data 114 of FIG. 1) which may include gaps between critical events.

At 314, the process may adjust a master build plan based on the confidence scores. For example, in FIG. 2, the confidence scores 244 associated with the critical features 240 may be used to adjust the replenishment planning 108 (e.g., adjust how many units of a particular product to manufacture to replenish the stock of the particular product) and the master build plan (MBP) 120.

Figure 4:
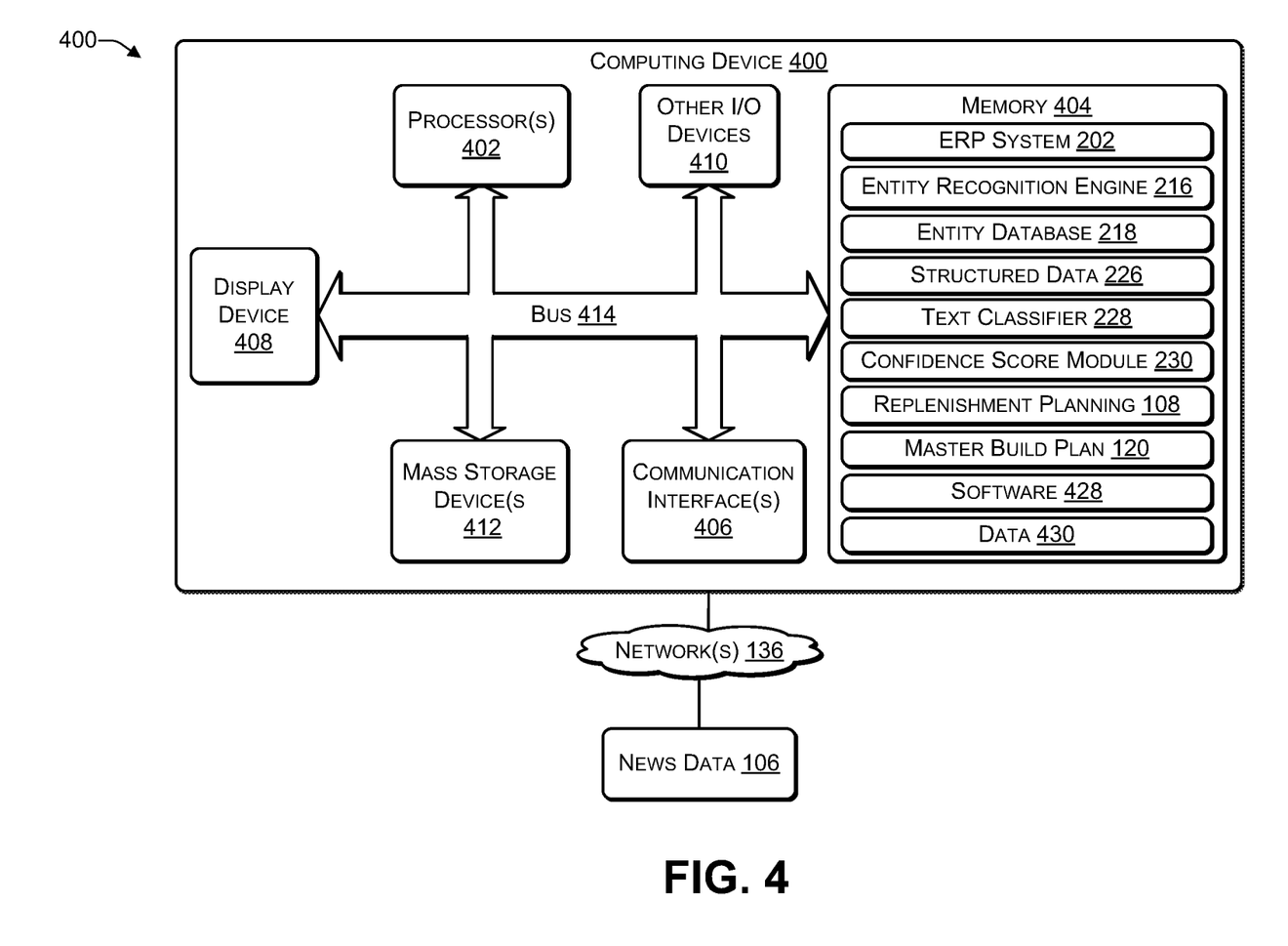
FIG. 4 illustrates an example configuration of a computing device that can be used to implement the systems and techniques described herein.

FIG. 4 illustrates an example configuration of a computing device 400 that can be used to implement the systems and techniques described herein, such as for example, the server(s) 102 of FIGS. 1 and 2.

The computing device 400 may include one or more processors 402 (e.g., including a CPU, a graphics processing unit (GPU), or the like), a memory 404, communication interfaces 406, a display device 408, other input/output (I/O) devices 410 (e.g., a keyboard, a trackball, and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated with a CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 136. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 402.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth.

The computer storage media, such as memory 404 and mass storage devices 412, may be used to store software and data. For example, the computer storage media may be used to store software 428 (e.g., operating system, drivers, applications and the like) and data 430 as well as the ERP system 202, the entity recognition engine 216, the entity database 218, the structured data 226, the text classifier 228, the confidence score module 230, the replenishment planning data 108, the master build plan 120, and other software and data, as described herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
obtaining, by one or more processors, a set of news items associated with entities stored in an entity database, wherein the set of news items is obtained from at least one website via the Internet, wherein at least a portion of the set of news items is pushed from the at least one website to a machine learning system, wherein an intelligent web scraper associated with the machine learning system identifies and pulls the at least a portion of the set of news items associated with the entities stored in the entity database, and wherein natural language processing provided by a natural processing language system applying one or more of support vector machines, Bayesian networks, maximum entropy, conditional random field, neural networks, and deep learning to the at least a portion of the set of news items to extract news features that are associated with the entities stored in the entity database;

processing, by the one or more processors, the extracted news features to identify critical features of the news items that is are predicted to affect one or more supply chains used to supply components to manufacture at least one product;

determining, by the one or more processors, a confidence score associated with each news item in the subset of news items;

modifying, by the one or more processors, a replenishment plan based at least in part on the predicted affect to the one or more supply chains to create a modified replenishment plan; and performing a modification, by the one or more processors, to a master build plan that includes a build plan associated with the at least one product based at least in part on the modified replenishment plan to modify an impact to the master build plan taking into account the critical features of the news items.

2. The method of claim 1, wherein: the plurality of entities are extracted from an enterprise resourcing planning (ERP) system.

3. The method of claim 1, wherein processing the extracted news features to identify critical features of the news items that is predicted to affect the one or more supply chains used to supply components to manufacture the at least one product comprises:
performing a term frequency-inverse document frequency (TF-IDF) analysis of the set of news items associated with the entities;
determining a TF-IDF value that increases proportionally to the number of times a particular entity of the entities appears in each news item offset by a number of news items in the set of news items that includes the word; and determining the subset of the news items based at least in part on the TF-IDF value associated with each of the entities.

4. The method of claim 1, wherein determining the confidence score associated with each news item in the subset of news items comprises: determining the confidence score using a long short-term memory (LSTM) recurrent neural network (RNN) algorithm.

5. The method of claim 1, wherein the plurality of entities comprises: a first plurality of people; a second plurality of locations; and a third plurality of organizations.

6. The method of claim 1, wherein obtaining the set of news items associated with the entities stored in the entity database comprises: selecting a particular news item;
using natural language processing (NLP) to determine that the particular news item is associated with a particular one of the entities; and
including the particular news item in the set of news items.

7. The method of claim 1, further comprising: determining the master build plan based at least in part on processing historical sales data using a Naive Bayes algorithm.

8. A server comprising: one or more processors; and one or more non-transitory computer readable media to store instructions executable by the one or more processors to perform operations comprising:
obtaining a set of news items associated with entities stored in an entity database, wherein the plurality of entities are extracted from an enterprise resourcing planning (ERP) system, wherein the set of news items is obtained from at least one website via the Internet, wherein at least a portion of the set of news items is pushed from the at least one website to a machine learning system, wherein an intelligent web scraper associated with the machine learning system identifies and pulls the at least a portion of the set of news items associated with the entities stored in the entity database, and wherein natural language processing provided by a natural processing language system applying one or more of support vector machines, Bayesian networks, maximum entropy, conditional random field, neural networks, and deep learning to the at least a portion of the set of news items to extract news features that are associated with the entities stored in the entity database;
processing the extracted news features to identify critical features of the news items that is are predicted to affect one or more supply chains used to supply components to manufacture at least one product;
determining a confidence score associated with each news item in the subset of news items;
modifying a replenishment plan based at least in part on the predicted affect to the one or more supply chains to create a modified replenishment plan; and
performing a modification to a master build plan that includes a build plan associated with the at least one product based at least in part on the modified replenishment plan to modify an impact to the master build plan taking into account the critical features of the news items.

9. The server of claim 8, wherein processing the extracted news features to identify critical features of the news items that are predicted to affect the one or more supply chains used to supply components to manufacture the at least one product comprises:
performing a term frequency-inverse document frequency (TF-IDF) analysis of the set of news items associated with the entities; determining a TF-IDF value that increases proportionally to the number of times a particular entity of the entities appears in each news item offset by a number of news items in the set of news items that includes the word; and
determining the subset of the news items based at least in part on the TF-IDF value associated with each of the entities.

10. The server of claim 8, wherein determining the confidence score associated with each news item in the subset of news items comprises: determining the confidence score using a long short-term memory (LSTM) recurrent neural network (RNN) algorithm.

11. The server of claim 8, wherein the plurality of entities comprises: a first plurality of people; a second plurality of locations; and a third plurality of organizations.

12. The server of claim 8, wherein obtaining the set of news items associated with the entities stored in the entity database comprises:
selecting a particular news item;
using natural language processing (NLP) to determine that the particular news item is associated with a particular one of the entities; and
including the particular news item in the set of news items.

13. The server of claim 8, the operations further comprising: determining the master build plan based at least in part on processing historical sales data using a Naive Bayes algorithm.

14. One or more non-transitory computer readable media storing executable by one or more processors to perform operations comprising:
obtaining, by one or more processors, a set of news items associated with entities stored in an entity database, wherein the set of news items is obtained from at least one website via the Internet, wherein at least a portion of the set of news items is pushed from the at least one website to a machine learning system, wherein an intelligent web scraper associated with the machine learning system identifies and pulls the at least a portion of the set of news items associated with the entities stored in the entity database, and wherein natural language processing provided by a natural processing language system applying one or more of support vector machines, Bayesian networks, maximum entropy, conditional random field, neural networks, and deep learning to the at least a portion of the set of news items to extract news features that are associated with the entities stored in the entity database;
processing, by the one or more processors, the extracted news features to identify critical features of the news items that is are predicted to affect one or more supply chains used to supply components to manufacture at least one product;
determining a confidence score associated with each news item in the subset of news items; modifying a replenishment plan based at least in part on the predicted affect to the one or more supply chains to create a modified replenishment plan; and
performing a modification to a master build plan that includes a build plan associated with the at least one product based at least in part on the modified replenishment plan to modify an impact to the master build plan taking into account the critical features of the news items.

15. The one or more non-transitory computer readable media of claim 14, wherein: the plurality of entities are extracted from an enterprise resourcing planning (ERP) system.

16. The one or more non-transitory computer readable media of claim 14, wherein processing the extracted news features to identify critical features of the news items that is are predicted to affect the one or more supply chains used to supply components to manufacture the at least one product comprises:
    performing a term frequency-inverse document frequency (TF-IDF) analysis of the set of news items associated with the entities;
    determining a TF-IDF value that increases proportionally to the number of times a particular entity of the entities appears in each news item offset by a number of news items in the set of news items that includes the word; and
    determining the subset of the news items based at least in part on the TF-IDF value associated with each of the entities.

17. The one or more non-transitory computer readable media of claim 14, wherein determining the confidence score associated with each news item in the subset of news items comprises: determining the confidence score using a long short-term memory (LSTM) recurrent neural network (RNN) algorithm.

18. The one or more non-transitory computer readable media of claim 14, wherein the plurality of entities comprises: a first plurality of people; a second plurality of locations; and a third plurality of organizations.

19. The one or more non-transitory computer readable media of claim 14, wherein obtaining the set of news items associated with the entities stored in the entity database comprises:
    selecting a particular news item;
    using natural language processing (NLP) to determine that the particular news item is associated with a particular one of the entities; and
    including the particular news item in the set of news items.

20. The one or more non-transitory computer readable media of claim 14, the operations further comprising:
    determining the master build plan based at least in part on processing historical sales data using a Naive Bayes algorithm.

* * * * *